(12) United States Patent
Meeker et al.

(10) Patent No.: US 6,408,669 B1
(45) Date of Patent: Jun. 25, 2002

(54) METHOD AND APPARATUS FOR WHEEL SPINDLES AND THE LIKE WITH IMPROVED LRO

(75) Inventors: Steven Eugene Meeker, Norwalk; Richard Allen Scheufler, Jr., Collins; Christopher J. Zuck; John R. Beverick, both of Sandusky, all of OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/713,681

(22) Filed: Nov. 15, 2000

(51) Int. Cl.[7] .......................... B21D 28/32; B21D 53/26
(52) U.S. Cl. .................. 72/325; 72/335; 29/894.325; 29/894.362
(58) Field of Search .................. 72/325, 335, 334, 72/340, 356; 29/893.34, 894.362, 894.36, 894.325

(56) References Cited

U.S. PATENT DOCUMENTS

| | | | | | |
|---|---|---|---|---|---|
| 1,087,583 | A | * | 2/1914 | Hansen | 72/325 |
| 2,027,922 | A | * | 1/1936 | McNaught | 72/325 |
| 2,917,816 | A | * | 12/1959 | Samson | 29/894.362 |
| 3,429,171 | A | * | 2/1969 | Feher | 72/325 |
| 4,939,819 | A | * | 7/1990 | Moyer | 24/16 R |
| 5,263,353 | A | * | 11/1993 | Bakermans et al. | 72/335 |
| 5,816,093 | A | * | 10/1998 | Takeuchi et al. | 72/325 |
| 6,018,977 | A | * | 2/2000 | Kanno et al. | 29/894.362 |

* cited by examiner

Primary Examiner—Daniel C. Crane
(74) Attorney, Agent, or Firm—Scott A. McBain (57) ABSTRACT

A wheel spindle flange (and the like) has stud holes with soft surface hardness formed therein which permit non-rotational splines, studs and the like to be press-fitted therein with minimal press force at a centered press zone established between intentionally formed and dimensioned counterbores within the flange to minimize flange distortion and lateral run out of the spindle.

10 Claims, 8 Drawing Sheets

PRIOR ART

METHOD AND APPARATUS FOR WHEEL SPINDLES AND THE LIKE WITH IMPROVED LRO

BACKGROUND

A) Field of the Invention.

This invention relates generally to a method for manufacturing wheel spindles and more particularly, to a method for forming stud holes in the wheel spindle flange and the improved wheel spindle resulting therefrom.

This invention is particularly applicable to and will be described with specific reference to that portion of the wheel spindle manufacturing process in which stud holes are formed in the bearing steel spindle flange and serrated wheel lug nut studs are press-fitted therein with minimal flange distortion. However, those skilled in the art will recognize that the invention has broader application and can be applied to any manufacturing process wherein studs, shafts or splines are to be pressed into holes formed in flat steel surfaces such as flanges, ribs, spokes and the like with minimal distortion in the flat surface.

B) Prior Art.

Figure 1:
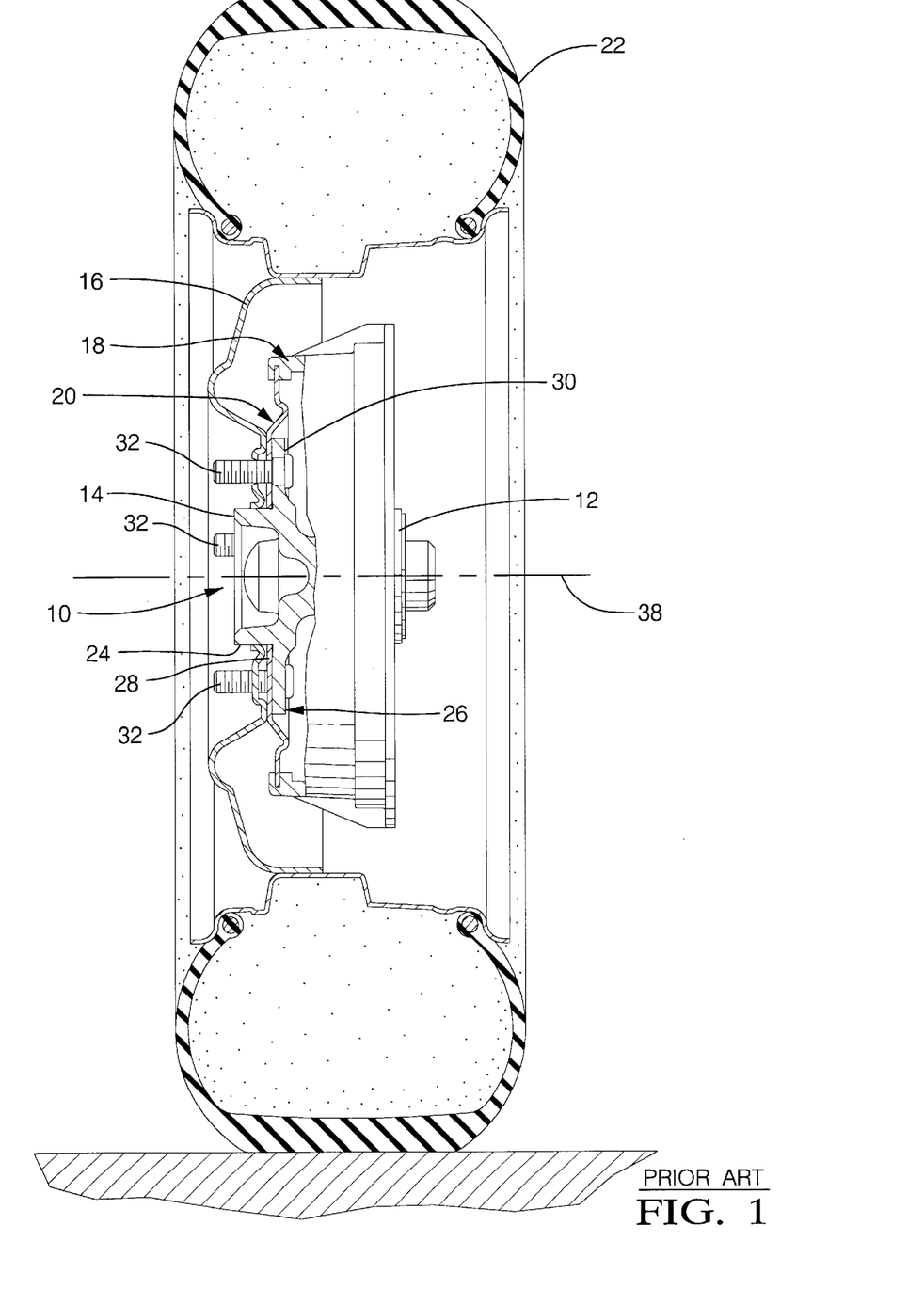
FIG. 1 is a partially sectioned, plan view of a prior art wheel bearing spindle, brake drum, wheel and tire.

Known wheel bearings of the type shown in FIG. 1 and indicated generally at 10, have a stationary outer hub 12, which is secured to a non illustrated vehicle suspension, and a rotatable wheel spindle, indicated generally at 14. Spindle 14 rotates about wheel bearing centerline 38 and it carries the vehicle wheel 16, as well as a brake drum 18. (Alternatively, brake drum 18 is replaced by a rotor if the vehicle is equipped with disc brakes.) Brake drum 18 is mounted to spindle 14 through an open, central circular hub 20. Specifically, spindle 14 includes a cylindrical pilot 24 with an outer surface over which the brake drum hub 20 is inserted, with a very close radial clearance. A flat annular wheel flange 26 radiates outwardly from the pilot 24, perpendicular thereto, with a flat outer or outboard surface 28 against which the brake drum hub 20 is abutted, and an axially opposed flat inner or inboard surface 30. The brake drum hub 20 is firmly sandwiched between spindle outboard surface 28 and wheel 16 itself, which in turn is bolted onto conventional wheel studs 32, when the vehicle is operating.

Today's automotive vehicles have improved ride handling characteristics with sensitive and precise steering and braking mechanisms. It is to be appreciated that brake drum hub 20 abuts, in face to face contact, outboard surface 28 of spindle 14 and that wheel 16 similarly contacts brake drum hub 20 so that spindle flange 26, brake drum hub 20, wheel 16 and tire 22 all rotate as one unit when the vehicle is in motion. So long as wheel flange 26 retains perpendicularity with wheel bearing centerline 32 throughout rotation, all components rotate consistently uniform. However, if the flatness of outboard surface 28 is warped or distorted, a lateral movement of all components will be experienced during each wheel rotation which is commonly referred to as lateral run out or LRO in the art. While LRO may occur for any number of reasons, variations in the flatness of outboard surface 29 contributing to LRO produces undesirable effects on the handling characteristics of the vehicle. For example, if spindle flange 26 is or becomes excessively wrapped, the vehicular operator will sense a pulsation in the brake pedal as the brakes are applied and seat against rotating brake drum hub 20. That is, seating of the brakes will not be uniform because LRO causes the drum to axially slip relative to the brakes and non-uniform seating will produce a force pulsation felt in the brake pedal. This pulsation is not desirable especially in performance or luxury vehicles. Similarly, the long lever arm between tire/road contact and stud circle significantly increases tire displacement attributed to LRO during each wheel rotation. The axial displacement is absorbed by the tire's side wall but not without an adverse effect on the handling characteristics of the vehicle. It is also possible to detect the LRO affects in the vehicle's steering wheel. The discerning car buyer will not purchase a vehicle if the steering is not precise, stable and solid at all vehicular operating speeds.

Wheel spindles are generally formed as forgings from bearing steels. The bearing races in the spindle are locally heat treated such as by induction heat treating methods to relatively high hardness. The remainder of the wheel bearing spindle is at a low hardness such as that produced by the conventional normalizing heat treat process to which the spindle is initially subjected to. Localized heat treat is necessary because outboard and inboard flange surfaces 26, 28 are machined flat. In particular, outboard surface 28 is machined flat to within a tolerance expressed in microns. Stud holes as well as other holes are then formed in the flange for wheel studs 32. Wheel studs 32, which have serrations for an interference fit, are then pressed into the stud holes. The interference fit is such that the stud must shear before it can rotate in the stud hole. The force required to press the studs into the stud holes is large. While flange outboard surface 28 is securely supported or backed up during the stud pressing step, one of the underpinnings of the invention is the recognition that the forces required to press the studs into the wheel flange at the required interference press fit can cause or contribute to flange distortion and LRO no matter what jigs or fixtures are used to support and/or clamp the wheel flange during the stud pressing step.

SUMMARY OF THE INVENTION

Accordingly, one of the major objects of the invention is to provide a method for forming a hole(s) into a flat surface, particularly a wheel spindle flange, into which studs, splines, shafts and the like can be press-fitted with a minimal flange distortion force.

This object along with other features of the invention is achieved in a method for forming an opening in a bearing metal flange into which is pressed a serrated shaft comprising the steps of providing a blanking die having an opening on one side of the flange (bottom side) and a punch having a diameter smaller than the blanking die opening at the opposite side of the flange (top side) and forcing the punch through the flange to produce a frusto-conical, axially-extending flange opening having a minor diameter equal to the punch diameter at the top flange side and a major diameter equal to the blanking die opening at the bottom flange side. A coining punch of diameter equal to or greater than the shaft major diameter is next provided and the coining punch is forced into each end of the frusto-conical opening a set axial distance sufficient to extrude, at least in the frusto-conical opening adjacent the minor diameter, a work hardened upset mass while providing countersunk openings at the axial ends of the frusto-conical opening. A serration punch is then provided and the punch is forced through the frusto-conical opening from the top flange side to produce a cylindrical stud hole axially extending between the countersunk openings while shearing the work hardened upset metal mass from the frusto-conical opening and forming radially outwardly extending serrations which extend for some axial distance in flange metal that is in a substantially non-work hardened state whereby the studs can be pressed through the substantially non-work hardened axial section of the hole with less force than that required if the hole surfaces were conventionally work hardened.

In accordance with another aspect of the invention, a method is provided for assembling studs in a machined flange of a wheel spindle which includes the steps of forming a plurality of circumferentially spaced stud holes axially extending through the flange with substantially non-work hardened hole surfaces. The process then coins stud holes at the inboard and outboard flange surfaces so that countersunk holes of approximately equal diameter extend approximately set axial distances into each stud hole. A stud is provided for each hole having a flat head, a threaded stem and a serrated shank portion between the head and threaded stem and the studs are pressed into the holes such that each stud's serrated shank portion extends into its respective stud hole whereby the pressing force exerted on the studs is transmitted to and at least partially absorbed by the substantially non-work hardened flange metal adjacent each hole spaced from the inboard and outboard flange surfaces. In accordance with this aspect of the invention, by providing countersunk openings at inboard and outboard flange surfaces terminating at an axially extending hole having a hole surface substantially in a non-work hardened state, the deformation in the axial hole is only from serrations pressing into the flange metal during the stud pressing operation which occurs principally in the "soft" flange center and not at the flange face surfaces so that whether the holes are drilled or punched (as described above), flange face distortion or warpness resulting from the stud press step is substantially reduced.

In accordance with another feature of the invention, preferred geometrical relationships are established when the stud holes are punched through a flange which produces an axial hole surface that is in a substantially non-work hardened state.

In accordance with yet another feature of the invention, certain geometrical relationships are established to produce an axially extending hole positioned between two countersunk openings which minimize flange face distortion when a non rotating 5 spline is pressed into the axial extending hole.

In accordance with a still further aspect of the invention an improved wheel spindle of bearing steel is provided having an unpressed and a final configuration. The spindle has a longitudinally extending shaft about which the spindle rotates and a flange extending radially outward from the shaft and perpendicular to the shaft's axis of rotation. The flange has a plurality of wheel stud holes axially extending therethrough at circumferentially spaced increments with a surface hardness of a divided hole in the unpressed condition and a wheel stud having a serrated section press-fitted in a non-rotational manner into and extending through each wheel stud hole in the assembled condition. In the preferred embodiment, each stud hole has a countersunk bore at each axial end axially extending into each stud hole a set distance whereby each stud hole axially extends through the flange a distance less than the thickness of the spindle flange whereby LRO is reduced. Depending on flange face and wheel hole geometry, one countersunk bore may be sufficient to shift the bolt distortion zone to avoid flange distortion.

It is thus one of the major objects of the invention to produce a wheel spindle flange with studs press-fitted in holes therein in which the wheel spindle flange has minimal LRO.

It is another general object of the invention to provide a method for forming a hole(s) in a flat, rotating surface such as a flange, spoke or the like (particularly stud holes in the flange of a wheel bearing spindle), through which a non-rotational bolt, stud, spline or the like is press-fitted, that minimizes lateral run out, particularly lateral flange run out, when the surface (particularly the wheel bearing spindle) is rotated about its center. Another general object of the invention is to provide a method for forming a hole(s) in a flat surface of a flange, spoke or the like (particularly stud holes in the flange of a wheel bearing spindle), through which a non-rotational bolt, stud, spline or the like is pressed at a minimal press force to establish a press fit.

It is another object of the invention to provide a method of pressing wheel studs into the stud holes in the bearing flange of a wheel bearing spindle with minimal bolt pressing force and/or minimal flange force distortion whether the holes in the bearing flange are pressed or drilled.

A yet more specific object of the invention is the provision of an improved method for punching wheel stud openings in the flange of a wheel spindle in which one or more or any combination of the following advantages are obtained:

1) reduced tonnage and improved tool life at the bolt hole pierce, hole serration and/or bolt pressing steps;

2) minimization of press fit zone distortion at the face surfaces of the flange by axial centering of the press zone between the hole and mating bolt;

3) minimizing of broken slug segments occurring in the hole serration forming step to avoid potential problems of drum or rotor seating against flange face;

4) improved through production by minimizing spalling in the stud holes when hole serrations are formed;

5) utilization of conventional punches and dies in all forming steps of the process thereby obviating the need for expensive, specially designed tooling;

6) consistently produced serrated holes attributed, at least in part, to forming serrations in metal which has not been significantly work hardened;

7) faster production cycles than achieved with drilled holes by punched holes having similar metallurgical characteristics (hardness) to drilled holes; and, 8) improved torque locking of stud in stud hole.

Still another object of the invention is to provide an improved wheel spindle.

These and other object, features and advantages of the invention will become apparent to those skilled in the art from the following detailed description of the preferred embodiment taken together with the accompanying drawings.

BRIEF DESCRIPTION OF THE DRAWINGS

The invention may take physical form in certain parts and arrangement of parts, a preferred embodiment of which will be described in detail herein and illustrated in the accompanying drawings which form a part hereof and wherein.

DETAILED DESCRIPTION OF THE INVENTION

Figure 2A:
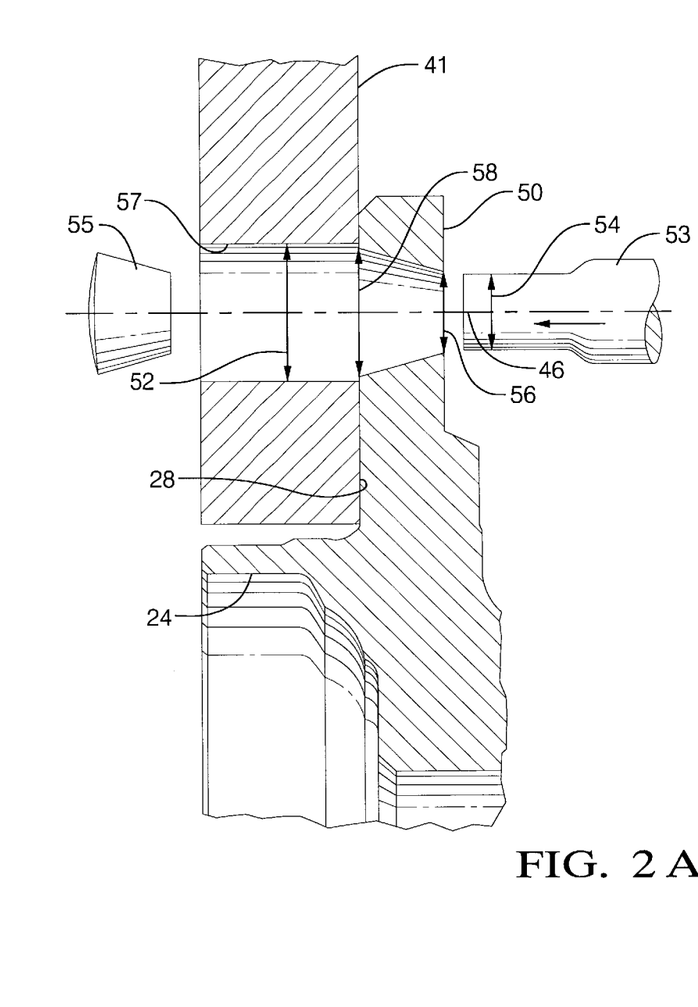
FIG. 2A is a schematic cross-section elevation view of a portion of a wheel bearing spindle flange having a stud hole pierced or punched therein in accordance with the invention.
Figure 2B:
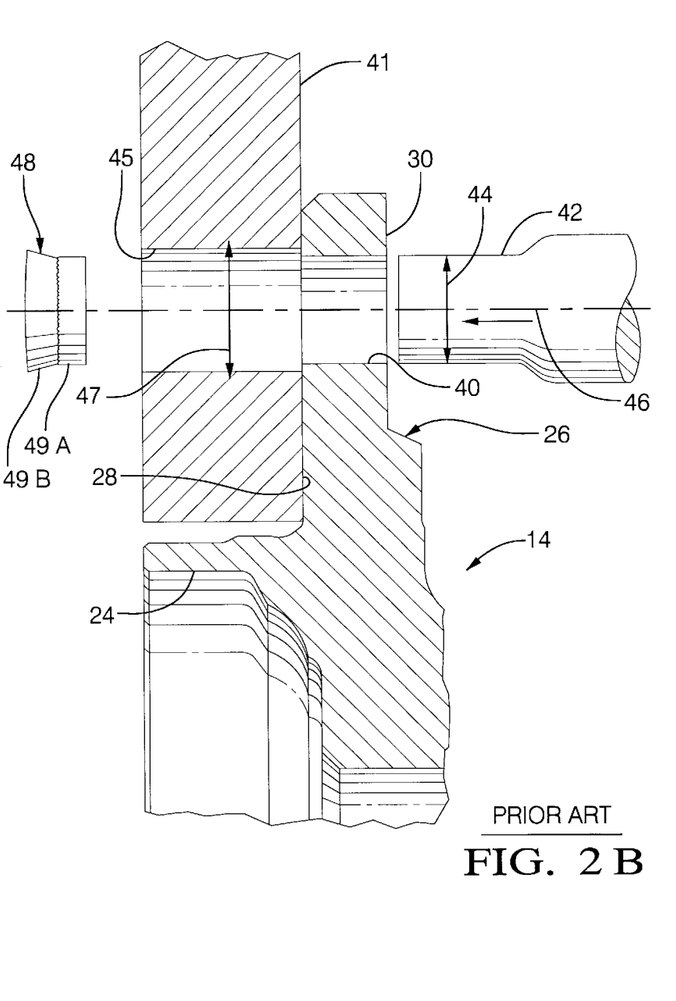
FIG. 2B is a view similar to FIG. 2A but illustrating the hole punch process used in the prior art.

Referring now to the drawings wherein the showings are for the purpose of illustrating preferred and alternative embodiments of the invention only and not for the purpose of limiting the same, there is shown in FIG. 2B the conventional step of punching a stud hole in the flange of a wheel spindle.

I. General Concepts.

The preferred embodiment of this invention is and this invention has specific application to forming stud holes or forming stud holes and pressing non-rotational wheel studs into the holes of wheel spindles to address the problems noted and discussed in the Background. It is believed beneficial to an understanding of how the present invention works to define and discuss, at least in a general sense, metallurgical and work hardening concepts which are utilized in this invention.

Wheel spindles are formed from bearing steels and the work, investigations, and prototypes leading to the invention have been performed with bearing steels. It is believed, predicated on the inventors' knowledge and experience, that the general concepts disclosed herein are applicable to metals (ferrite and non-ferrite) other than bearing steels. That is, the invention in its broader, conceptual sense is applicable to any steel so long as one skilled in the art considers how the steel behaves when applying the inventive concepts disclosed herein. At the same time, the wheel bearing steel spindle preferred embodiment has its own unique application which may be viewed as an inventive species falling within the inventive broader or genus scope of the invention. Thus, when dimensional or geometrical relationships are discussed below or are set forth in the claims, the relationships hold for bearing steels and steels having similar properties to bearing steels and may or may not hold for other steels or metals.

Those skilled in the art will recognize from this Detailed Description that in one aspect of the invention the stud holes are punched in a manner which avoids significant work hardening the stud hole surface to minimize distortion of the flange face when studs or splines are subsequently press-fitted in a non-rotational manner into the stud holes. Work hardening exists in all metals but the extent of the work hardening will obviously vary for different metals and even surface heat treatment of the same metals. For example, the wheel spindle in the preferred embodiment is normalized and work hardening a normalized bearing steel is different than work hardening a heat treat hardened bearing steel. Further, the wheel spindles of the preferred embodiment are forgings. Those skilled in the art know that forgings establish grain flow lines in the part while castings do not and the grain flow lines can affect work hardening. Insofar as the invention covers a wheel spindle, the invention is believed applicable to both wheel spindle castings and forgings, and is not viewed as limiting the invention.

Insofar as the term "bearing steel" as used herein is concerned, the inventors have considered the description of that term as used in the American Society of Metals, *Metals Handbook* (10th Edition, Volume 1, Pages 380–388). As discussed in the ASM Handbook, bearings have been manufactured in both high-carbon (1.00%) and low-carbon (0.20%) steels. The *Handbook* notes that for special integral bearing configurations such as automotive wheel spindles, high carbon steels are used. As noted in the Background, the ball races of the spindle are induction hardened, i.e., localized hardening. The surface ball race hardness of a wheel spindle is typically in excess of 60 Rockwell C. In contrast, low carbon steels achieve this hardness only by case carburizing. Conventional carburizing techniques, i.e., atmosphere or even ion carburizing, will carburize the entire spindle, including the flange, thus making machining of the spindle flange impractical. For this reason, among others, the preferred embodiment of the invention uses high carbon steels including those types of high carbon steels generally defined as such in the *Metals Handbook*. However, based on the inventors' experience, wheel spindle "bearing steel" of the "high carbon" type has a different carbon content than that defined in the *Handbook* and will be specifically defined below.

Figure 8:
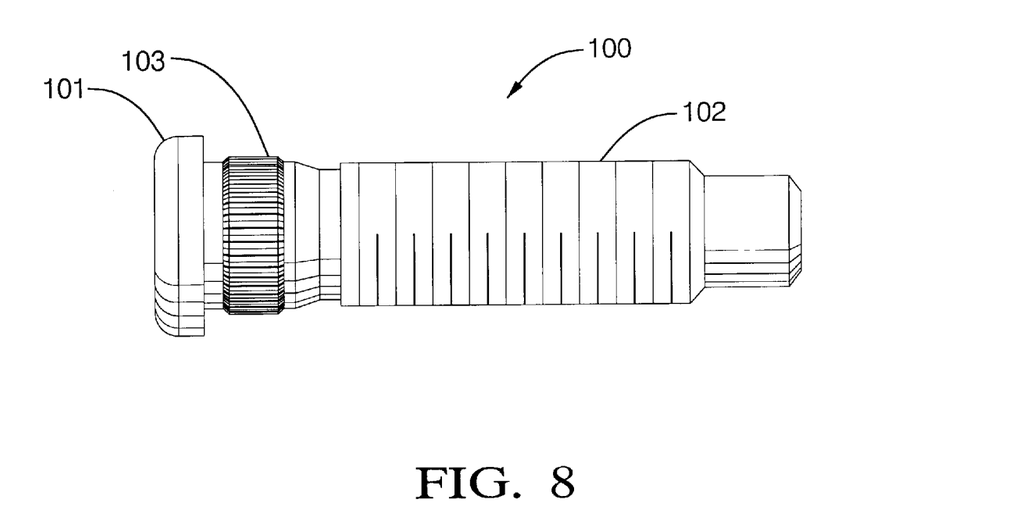
FIG. 8 is a longitudinal view of a conventional wheel stud; and, FIG. 9 is a schematic representation of the serrations formed on a wheel stud or in the stud holes.
Figure 9:
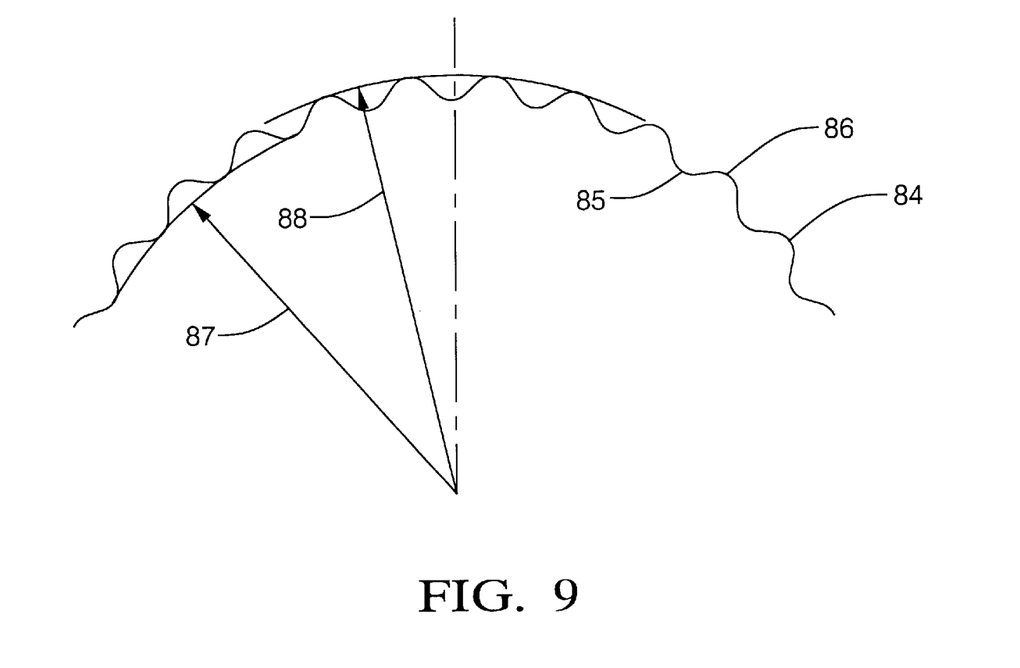

Those skilled in the art know that the carbon content of the steel is a primary consideration in cold working of the steel and effects its hardness, ductility, toughness, etc. and at a micro structure level, the crystallization planes, grain elongation, grain flow patterns, grain aspect ratio, etc. are also affected. For the bearing steels under discussion in the preferred embodiment of this invention reference should be had to FIGS. 8 and 9 of my U.S. Pat. No. 5,898,997, issued May 4, 1999, which figures are incorporated herein by reference and made a part hereof. In FIG. 9, the structure of an intentionally cold worked portion of a spindle radius adjacent the spindle flange section is disclosed and the grain pattern is shown gradually blending into wheel spindle steel not affected by the cold working. If the carbon content of the bearing steel was reduced, the work hardened or distorted grain structure would not be as widely dispersed as that shown in FIG. 9 of the '997 patent. FIG. 8 of the '997 patent shows the hardness of the cold worked section as a function of surface depth with the hardness being constant at about 40–45 Rockwell hardness "C" up to a depth distance of 0.015" from the cold work surface and then gradually further reduced at a depth distance of 0.015 to 0.070 inches from the surface. If surface depth of FIG. 8 was continued, the reduction in hardness would continue until the bearing steel reached the hardness it had prior to work hardening. This description of the '997 patent is for Background reference and as an aid in understanding the workings of the present invention. The '997 patent is directed to intentionally using a cold forming technique to enhance the performance capability of a wheel spindle while the present invention is directed, in part, to metal forming concepts which avoid or minimize work hardening to produce an improved work spindle.

With the foregoing discussion as a reference, this invention defines certain terminology used herein and in the claims to have the meanings ascribed the words as follows:

1) "Steel" means any steel with any alloying components and includes but is not limited to bearing steel.

2) "Bearing steel" means a high carbon steel and notwithstanding the ASM Handbook definition includes steels with a carbon content equal to or greater than 0.50%. Bearing steels can include conventional alloy elements and specifically can include one or more alloys selected from the group consisting of manganese (Mn), sulphur (S), phosphorous (P), silicon (Si), chromium (Cr), copper (Cu), nickel (Ni), and molybdenum (Mo).

3) "Substantially non-work hardened" as a general definition means that portion of steel which has not increased in hardness from the hardness the steel had prior to being worked or work hardened by the step(s) described at a distance from the surface of the work hardened steel equal to or greater than a distance of about 0.015". Specifically, in the wheel spindle bearing steel application of the invention and not withstanding the depth of grain distortion, "substantially non-work hardened steel" means the steel has a surface hardness approximately (±2 units on the Rockwell "C" scale) equal to the hardness the wheel bearing steel has at the surface of a drilled hole. Steel surface includes the serration or undulation "valley".

4) "Normalized" means the grain structure metallurgically produced not only by heating the steel above its austenitic or upper critical temperature and air cooled (its classical definition) but also the grain structure produced by any annealing or homogenizing process that refines the grain structure to produce or induces a soft but machinable steel. The hardness of a normalized bearing steel can be in the Rockwell G ranges. However, when the spindle flange is machined, its surface hardness increases into the Rockwell "C" range and when a hole is drilled into the machined flange, the hardness of the hole surface is typically at 29–31 Rockwell "C".

5) "Countersunk bore" or "countersunk hole" includes but is not limited to cylindrical openings. In particular, the peripheral edge of the countersunk hole or bore can have any configuration such as arcuate, compound curve, taper, etc. as well as cylindrical. However, countersunk bore or hole has an opening greater than the stud flange hole diameter and a depth greater than a corner break or a relief radius.

6) "Press fit" means an interference fit between stud and hole such that the stud shears or breaks before it rotates in the hole.

II. The Hole Punch Step.

Referring still to FIG. 2B, there is shown the first step in a conventional, commercially acceptable method for forming stud holes in the flanges of a wheel spindle comprised of bearing steel. As already indicated, before spindle 14 reaches the stud hole forming step, a blank is forged into the configuration of spindle 14. The forging is normalized and the bearing races (not shown) are then induction hardened to a relatively high Rockwell C hardness. Inboard flange surface 30, which is at a normalized bearing steel condition, is machined flat. Outboard bearing surface 28 is also machined flat and perpendicular to spindle axis 38 within micron tolerances after the holes are punched and before the wheel studs are pressed into the holes. With spindle 14 in this condition, a plurality of circumferentially spaced flange holes 40 axially extending through spindle flange 26 are formed.

There are two conventional ways for forming flange holes 40. In the first method, flange holes 40 are simply drilled and when drilled, the bearing steel is not materially increased in hardness compared to metal stamping processes. (Application of the invention to drilled holes is described in section "V" below.) However, the surface hardness of a drilled hole in the bearing stud is about 28–32 Rc. Drilling, however, is expensive considering drill bit wear and is time consuming. In practice it is used for small production runs which cannot justify the die expense. It is preferred to mass produce spindles 14 by simply punching or piercing flange holes 40.

This is conventionally accomplished by a backing die indicated schematically by reference numeral 41 and a striking die carrying or protruding from which is a plurality of circumferentially spaced hole punches 42. Backing die 41 is a heavy annular ring, cut from a suitable die steel, and basically serves as a support, conforming to and backing up wheel flange outboard surface 28. The striking die (not shown) is likewise an annular ring and the hole punches 42 are formed from suitable die steel. It should also be noted that other through holes in wheel flange 26 other than and smaller than flange holes 40 (not shown) are also punched into flange 26 in a manner similar to that in which flange holes 40 are formed. Because non-rotating splines are not subsequently press-fitted into the other flange holes and punching the other holes, per se, in the die arrangement described does not distort the flatness of spindle flange 26, the other holes will not be described or discussed further herein. In prior art FIG. 2B, the diameter of punch 42 indicated generally by reference numeral 44 is sized to be slightly greater than the "valley" or minor diameter of the serrations formed on the wheel stud bolt as defined below. Backing die 41 has a through receiving hole 45 axially aligned with punch centerline 46 and sized with a receiving hole diameter indicated generally by reference numeral 47 which is approximately equal to punch diameter 44. With this arrangement, cylindrical flange holes 40 are pierced or punched through spindle flange 26 by hole punches 46 and a hole slug 48 is punched out of flange 26. Normally, punching or piercing operations are shearing actions forcing slip to occur at the outer surface grain boundaries of the hole slug 48 and the stationary grain boundaries at the surface of flange hole 40. Shearing normally does not cause significant work hardening in the surface of the hole formed. What has been observed, however, is that a high punching force is required and hole slug 48 is not unitary. Flange hole 40 is cylindrical and straight, but slug 48 is typically formed with two slug segments schematically indicated by reference numerals 49A, 49B which is a clear indication that punch 46 is producing compressive as well as shear stresses when it punches hole slug 48. In fact, the surface of flange hole 40 has been work hardened to a significant extent in the conventional pressing step illustrated in FIG. 2B.

Referring now to FIG. 2A, the present invention is also shown to employ, in the preferred embodiment, a punching step to produce a truncated flange hole 50 which is conical or more precisely, frusto-conical, in configuration as shown. The same backing die 41 and hole punch die are used in the inventive punching step. However, backing die 41 has a larger receiving hole 51 of larger hole diameter indicated by reference numeral 52 which is greater than the prior art receiving hole diameter 47.

Hole punch 53 has a new punch diameter indicated generally by reference numeral 54 which is smaller than prior art hole punch diameter 42. When punch 53 punches truncated flange hole 50, a unitary, smooth truncated slug segment indicated schematically as reference numeral 55 is discharged through larger receiving hole 51 of backing die 41. Truncated flange hole 50 has a minor diameter indicated by reference numeral 56 which is equal to punch hole diameter 54 and a major diameter indicated by reference numeral 58 which is equal to larger receiving hole diameter 52. By sizing the punch-die arrangement disclosed in FIG. 2A, what occurs is essentially a fracturing of truncated slug segment 55 producing truncated flange hole 50. That is, the impact of the punch die 42 fractures or causes a clean shear break, as indicated by the unitary, even structure of truncated slug segment 55 and truncated slug segment is ejected from frusto-conical flange hole 50 prior to the punch passing through major diameter 58 of truncated flange hole 50. In contrast, prior art punch 42 pushes hole slug 48 out of flange hole 50 in steps corresponding to the segments formed. The result is that the inventive method uses less punching force than that of the prior art method described in FIG. 2B with less work hardening in the surface of axially extending truncated flange hole 50. Less punch force coupled with the fracture or impact production of truncated flange hole 50 means longer punch and backing die life and less wear and tear on the press.

In the preferred bearing steel embodiment, certain dimensional relationships will produce a clean fracture with minimal work hardening of the flange hole. Thickness or the axial through dimension of spindle flange 26 is conventionally established at about ⅜" and clean fractures can be established at this flange thickness at major hole diameter 58 which is approximately 15–40%, preferably 20–30%, and more preferably, slightly in excess of 20% greater than minor diameter 56 of truncated flange hole 50. Minor diameter is between about 80% to 100% of the diameter of punch 53. If steel other than bearing steel is used, the ratios described may or may not work. Softer steels may require a lower ratio (or function in a lower portion of the range specified) while harder steels may function at even higher ratios (or function in a more narrow higher portion of the range) than stated.

III. The Coining Step.

Figure 3A:
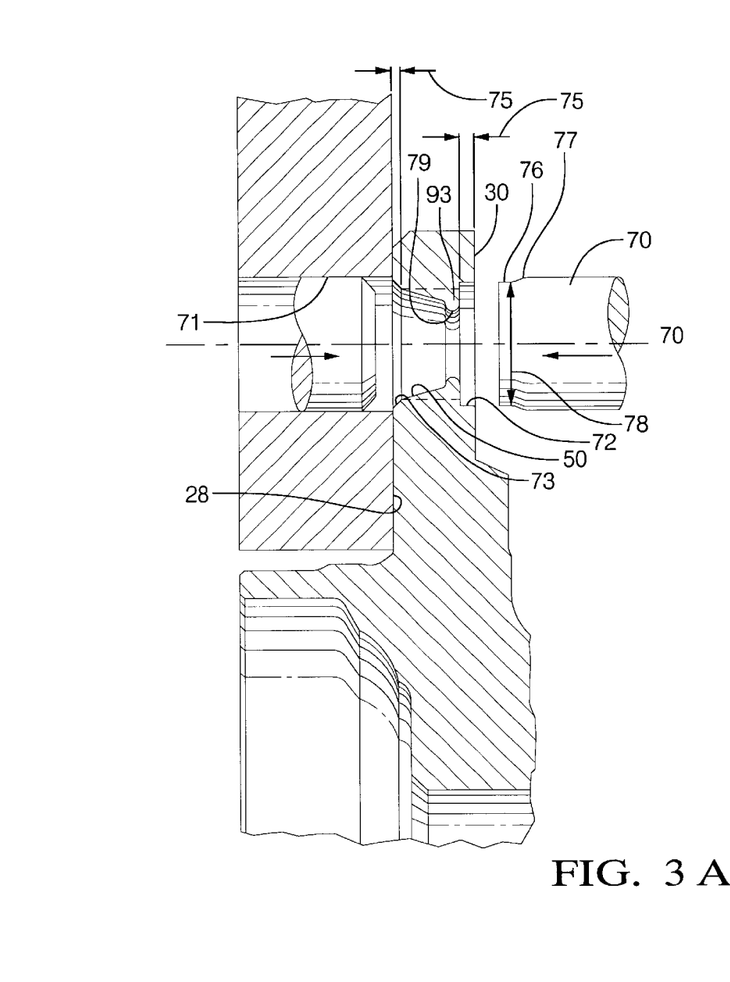
FIG. 3A is a view similar to FIG. 2A schematically illustrating the coining step of the present invention.
Figure 3B:
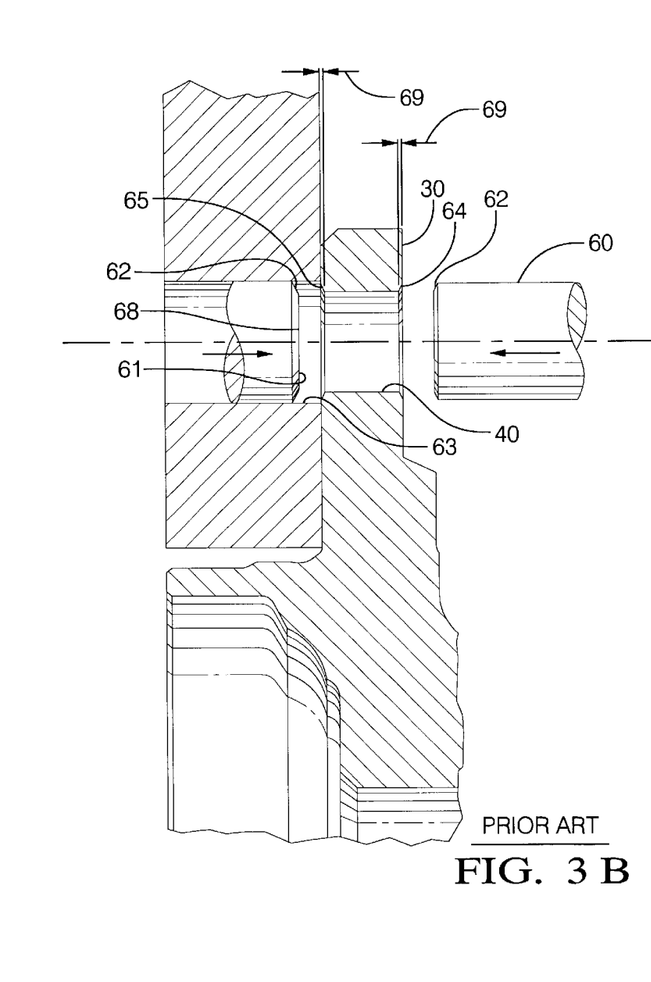
FIG. 3B is a view similar to FIG. 3A but illustrating the coining step used in a prior art process.

Referring now to FIG. 3B, there is schematically illustrated a prior art coining step which is performed in flange hole 40 after completing the punching step disclosed in FIG. 2B. The prior art coining step provides a top corner break 64 as relief at the intersection of flange hole 40 with inboard flange surface 30 and a bottom corner break 65 as relief at the intersection of flange hole 40 with outboard flange surface. Primary purpose of corner breaks 64, 65 is to prevent raised metal at the sharp hole/surface intersections. In addition, top corner break 64 allows or assists in stud head seating and bottom corner break 65 removes any metal at outboard flange surface 28 left after the FIG. 2B punching step which could hinder seating of brake hub 20 while also somewhat allowing egress of serration segments in the serration step to be described below. In this step, a plurality of top coining punches 60 each having a fillet or radiused relief forming edge 62 (shown exaggerated for drawing clarity in FIG. 3B) protrude from an annular striking die (not shown) similar to that described with reference to FIGS. 2A and 2B. A backing die has a plurality of backing die openings 63. Each backing die opening 63 receives a bottom coining punch 61 identical to top coining punch protruding from a bottom striking die (not shown) and top and bottom coining punches 60, 61 are operated simultaneously to form top and bottom corner breaks 64, 65. It is important to note that the axial distance designated by reference numeral 69 for each corner break 64, 65 extends into flange hole 40 (shown exaggerated for drawing clarity) is insignificant, i.e., a small fraction of a millimeter. (Note that because the flange face is machined prior to stud insertion, the axial depth of the corner break is reduced, i.e., insignificant.) There is no mass upset formed in flange hole 40 from the coining operation. This can be seen from study of the photomicrograph shown in FIG. 4B. Photomicrograph 4B, (50×magnification) shows at the top portion of flange hole 40 the top corner break 64 transitioning to the surface of flange hole 40 which in turn shows the elongated grain flow structure at the hole surface resulting from cold working the steel in the FIG. 2B step.

Referring now to FIG. 3A, there is shown schematically a coining step employed in the method of this invention. An inboard or top coining punch 70 and an outboard or bottom coining punch 71 is provided in the backing die and top and bottom striking die arrangement discussed with reference to FIG. 3A. Top coining punch 70 produces an inboard countersunk opening 72 and bottom coining punch 71 produces an outboard countersunk opening 73. In the preferred embodiment, top and bottom coining punches 70, 71 are dimensionally identical and in the preferred embodiment are punched at equal axial increments designated by reference numeral 75 into truncated hole flange 50. The axial distance into truncated hole that countersunk openings 72, 73 extend, distinguish countersunk openings 72, 73 from prior art corner breaks 64, 65. In the preferred embodiment, and as diagrammatically shown in FIG. 3A, top and bottom coining punches 70, 71 have a cylindrical depth section 76 transitioning or blending into a radius or fillet 77 (resembling corner breaks 64, 65) into flange surfaces 28, 30. However, by definition, countersunk openings (or countersunk bores) 72, 73 can have any peripheral edge configuration (i.e., taper, compound curve) so that technically a countersunk opening is, as readily acknowledged by those skilled in the art, different from a corner break or relief radius by the distance the countersunk extends into a hole. In the preferred embodiment, for bearing steels, the axial distance each countersunk opening 72, 73 extends into truncated flange hole 50 is within the range of 10 to 25% of the axial length of flange 26 (the finished stud hole length—after machining flange surfaces 28,30). It should be sufficient to note that corner breaks 64, 65 do not axially extend anywhere near the 10% minimal flange dimension As will be described below, the countersunk axial distance defines a distortion press zone.

Figure 4A:
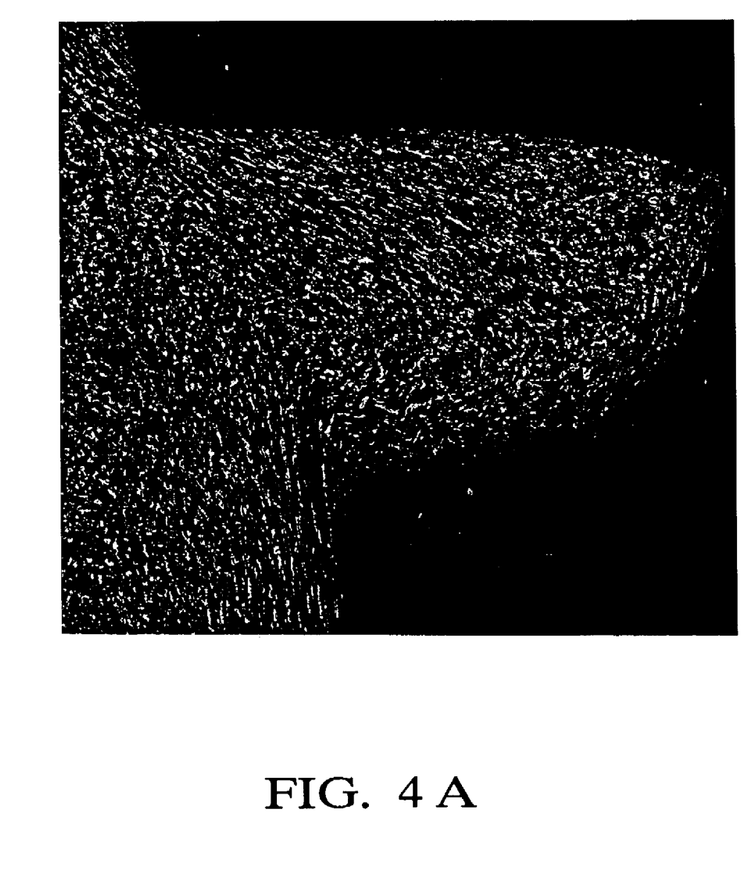
FIG. 4A is a photomicrograph of the upset produced in the top portion of the stud hole during the coining step of the present invention depicted in FIG. 3A.
Figure 4B:
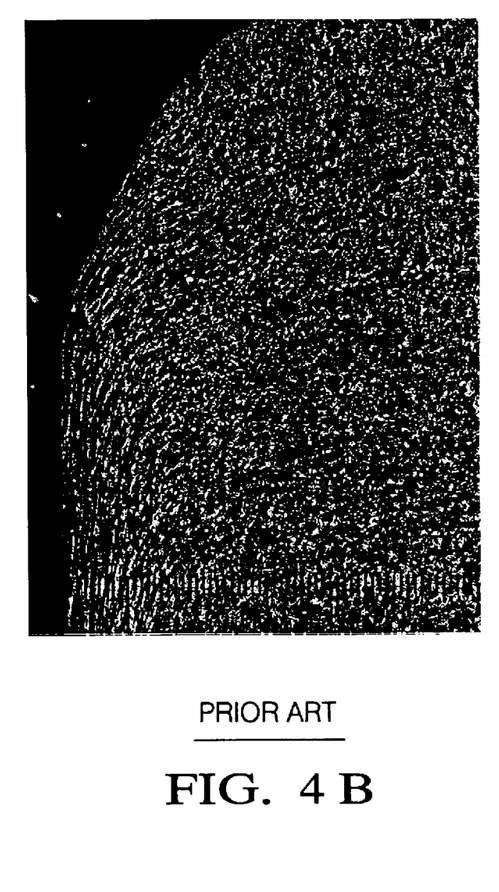
FIG. 4B is a photomicrograph of the entry portion of the stud hole produced in the prior art coining step depicted in FIG. 3B.

Importantly, because of the dimension of minor diameter 56 and the diameter of top coining punch 70 designated by reference numeral 78, an upset mass protrusion 79 is formed at what is now the entry of truncated flange hole 50. This upset mass is gradually formed as top coining die 70 progresses into the flange opening increasingly working the metal to a high hardness. Reference can be had to the photomicrograph shown in FIG. 4B (50×magnification) which illustrates grain flow lines of upset mass 79. Note the grain distortion extends completely around upset mass 79 and continues in a pronounced manner at the juncture of the upset mass with truncated opening 50. This pattern is important for performing the serration step discussed below. In the preferred embodiment, the surface hardness of upset mass 79 is 36 Rc. This compares to a hardness of 35 Rc formed at the corner break of FIG. 4B photomicrograph. (Axial hole positions of FIGS. 4A and 4B are not precisely the same.)

It is also noted that to a significantly lesser extent, an upset mass is also formed at outboard countersunk opening. Because the diameter of bottom coining punch 71 (equal to top coining punch diameter 78 in the preferred embodiment)

is about equal to major diameter 58 of truncated flange hole 58, the upset mass, even at the 25% hole depth range limitation, is not that significant. However, the formulation of an upset mass adjacent outboard flange surface 28 has no significant effect on the workings of the punch aspects of the invention because this is bottom upset mass (not shown in FIG. 3A) severed at the end of the serration step, as described below. The coining punch diameter 78 has to be large enough relative to the dimensions of truncated flange opening 50 to produce an upset mass 79 of steel sufficiently work hardened in the coining forming step to shear during the serration step described below. In the preferred embodiment, the countersunk diameter is sufficient to still provide sufficient bearing area between inboard flange surface 28 and the underside surface of the head of the wheel stud to be within or provide normal hole/bolt head seating surfaces. However, in the broader scope of the invention, coin punch diameter 78 could be sufficiently large to receive the head of a bolt or stud press-fitted into the hole.

IV. The Serration Step.

Figure 5A:
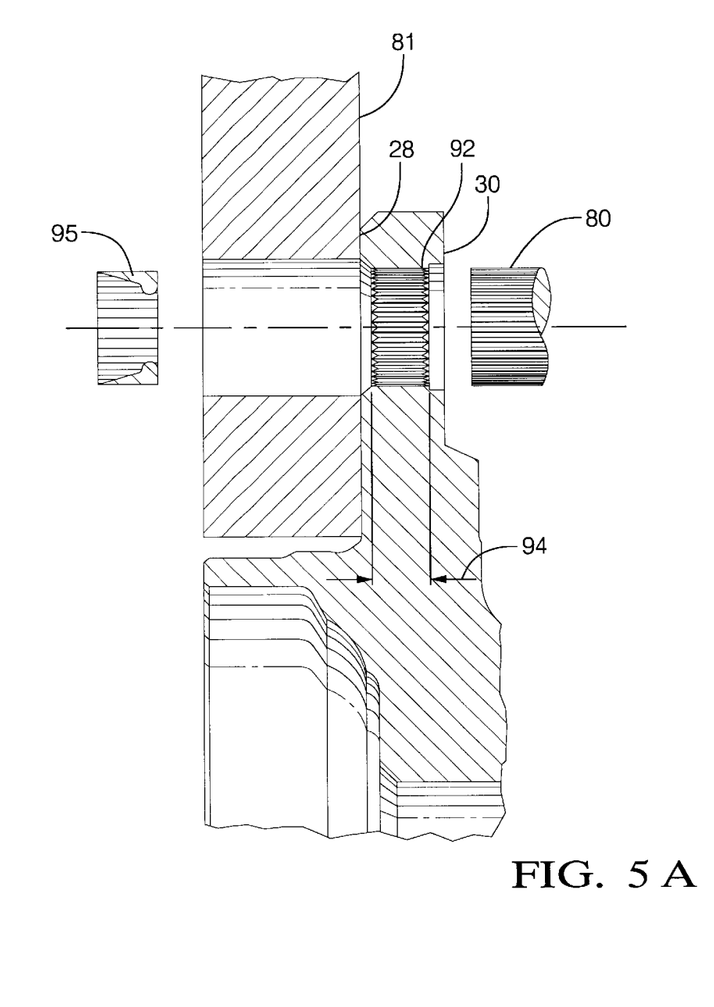
FIG. 5A is a view similar to FIG. 1A but schematically illustrating the serration step used in the process of the present invention.
Figure 5B:
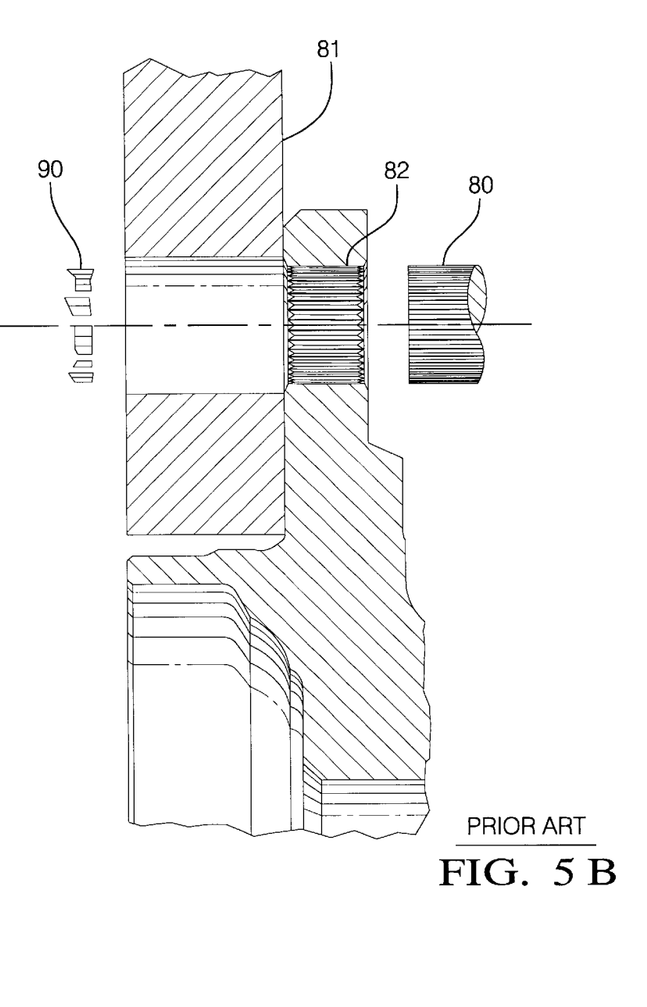
FIG. 5B is a view similar to FIG. 5A but illustrating the serration step employed in a prior art process.

Referring now to prior art FIG. 5B, there is shown a conventional serration punch 80 which is punched through flange hole 40 to produce a hardened serrated stud hole 82. As in the other stations, a tool steel hardened annular backing die 81 with slug receiving openings and an annular, tool steel striking die (not shown) carries a plurality of serration punches 80 to produce hardened serrated stud holes 82. The serrations may best be described by reference to FIG. 9 which shows a portion of an end or edge view of the serrations. The serrations comprise a plurality of circumferentially spaced regularly repeating undulations 84 with each undulation having a peak 85 and a valley 86 (peaks and valley terminology reversed for stud serrations). Preferably, each peak and valley 85, 86 is rounded so that undulations 84 resemble a sine wave. Peaks 85 of all undulations lie on an imaginary circle which will be defined for consistency in terminology with respect to the stud bolt as a minor diameter circle indicated generally by reference numeral 87. Each valley 86 of each undulation 84 lie on the circumference of a circle referred to herein as a major diameter circle indicated generally by reference number 88.

Referring still to prior art FIG. 5B, and as previously discussed, flange hole 40 is work hardened. If a serrated stud bolt is pressed into the work hardened surfaces of flange hole 40 without serrations or undulations 84 present, significant distortion in the flange face can occur. By removing some of the work hardened metal in flange hole 40 vis-a-vis the serrations or undulations 84, the undulations formed in flange hole 40 can deform somewhat to produce the desired stud/hole interference fit as described further below. When conventional serration punch 80 is pressed into work hardened flange hole 40 to form serrations or undulations 84, further work hardening of the flange hole occurs to produce hardened serrated stud hole 82. This is evidenced by broken serration slug segments indicated schematically by reference numeral 90 which result. As broken serration slug segments 90 are formed while serration punch 80 is traveling through the axial length of the hole, the slug segments are actually caught in the flutes of the serration punch and cause binding and additional work hardening of the hole surface as the serration punch travels the axial distance of flange hole 40. This requires strong fixturing of the serration punch in the striking die to insure centering of serration punch 80 in flange hole 40 as the serrations are formed. In some instances, formation of slug segments 90 can become so severe that the segments can form "balls" that actually spall the hole surface from each axially extending channels and not the desired serrations or undulations 84. This spalling condition, if it occurs (which is a rare case), can prevent the wheel stud, in theory, from being locked into hardened serration stud hole 82.

Figure 6A:
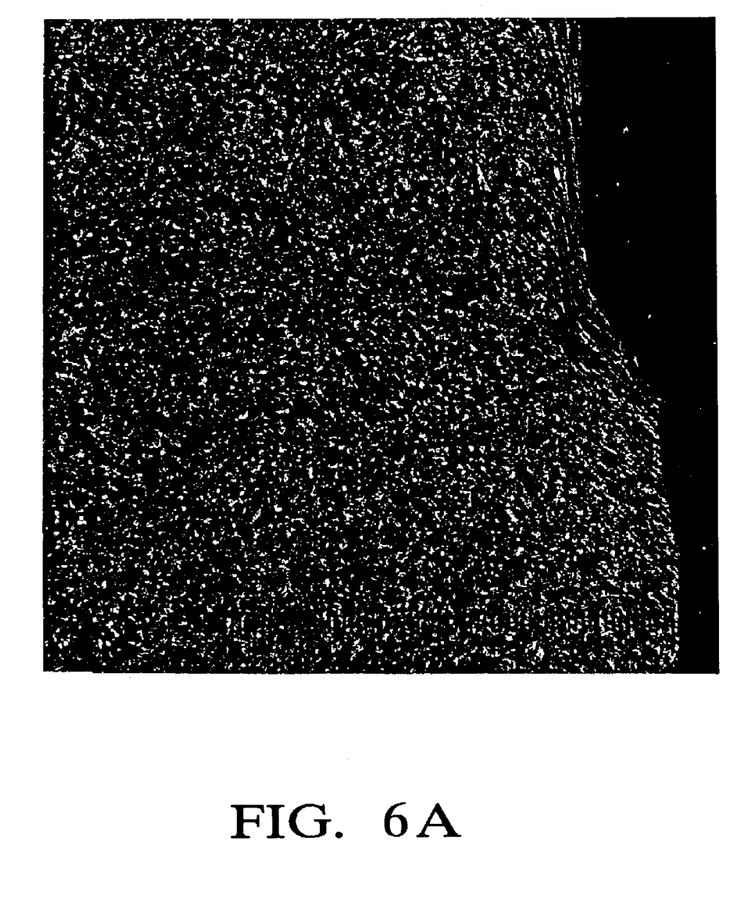
FIG. 6A is a photomicrograph of the top portion of the stud hole in the area where the mass upset shown in FIG. 4A was present following the serration step depicted in FIG. 5A.
Figure 6B:
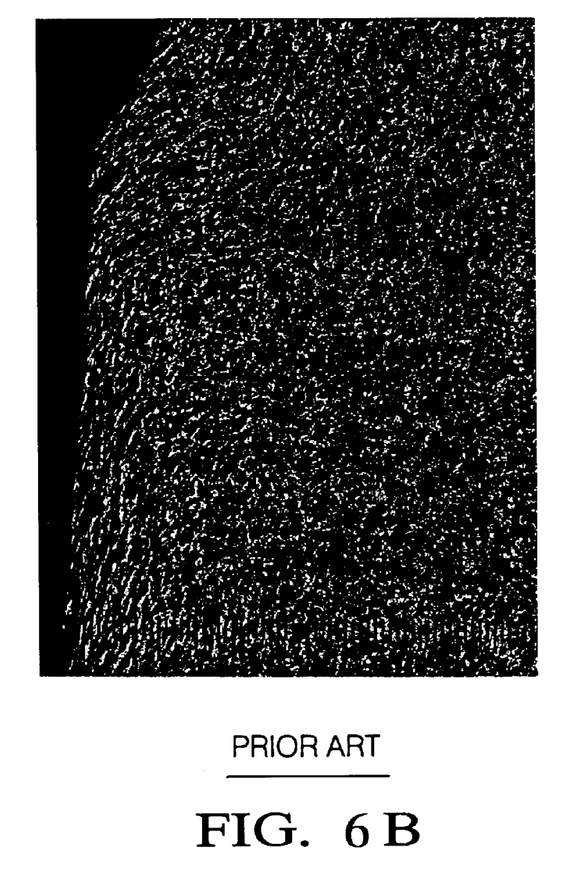
FIG. 6B is a photomicrograph of the top portion of the prior art stud hole corresponding to FIG. 4B produced in the serration step depicted in FIG. 5B.
Figure 7A:
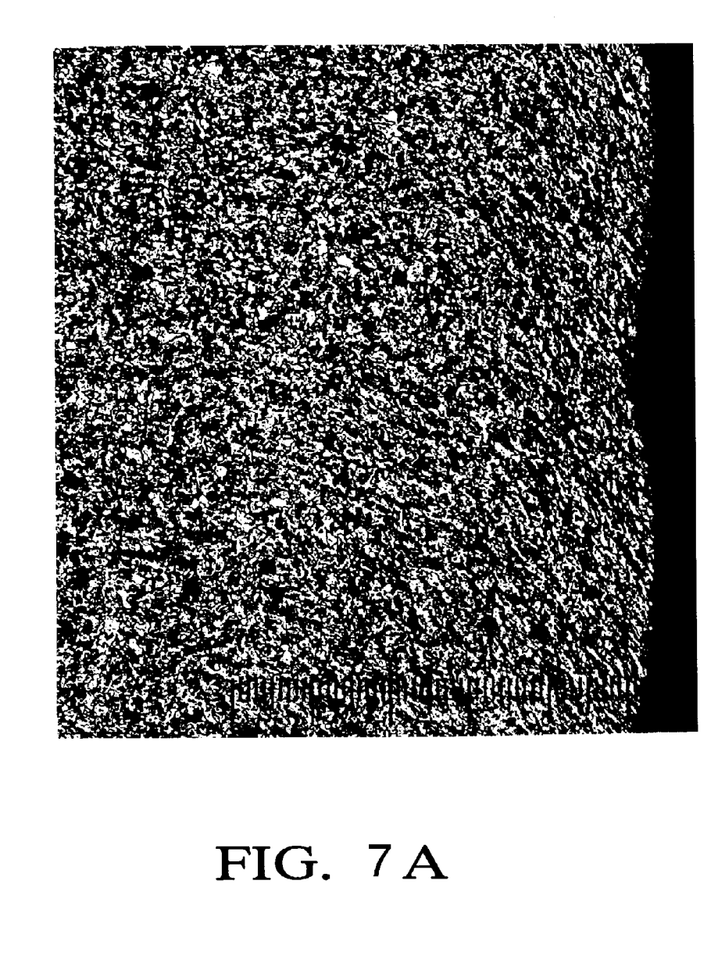
FIG. 7A is a photomicrograph of the stud hole at the axial mid-point following the serration step of the present invention depicted in FIG. 5A.
Figure 7B:
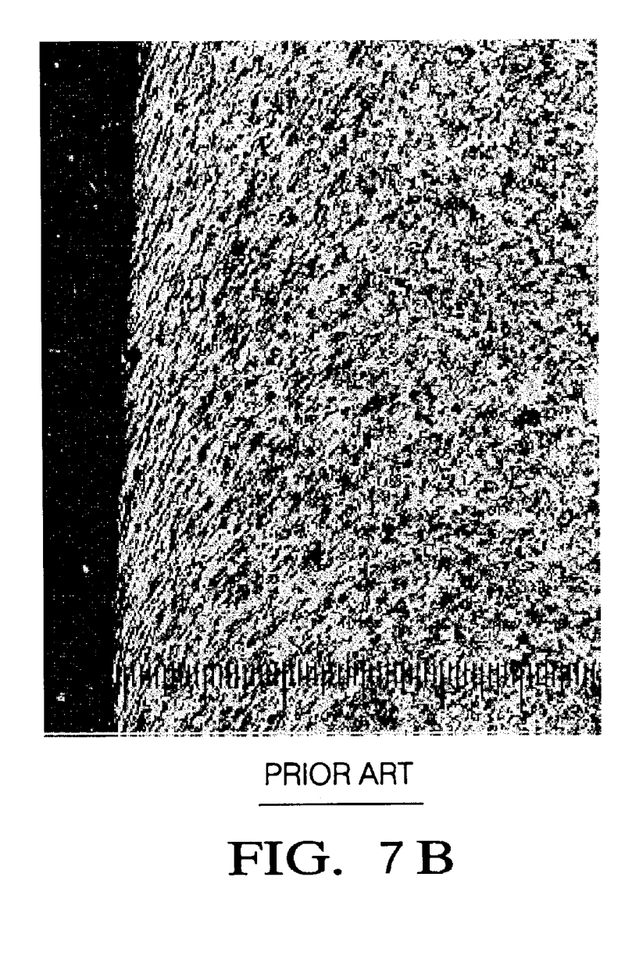
FIG. 7B is a photomicrograph of the stud hole at the axial midpoint following the prior art serration step depicted in FIG. 5B.

Referring now to FIG. 6B, there is shown a photomicrograph (50×magnification) of the surface of hardened serrated stud hole 82 at the entrance of the hole corresponding to that depicted in photomicrograph shown in FIG. 6B. Reference can also be had to FIG. 7B which is a photomicrograph (also 50×magnification as are all photomicrographs) of a portion of the surface of prior art hardened serrated hole 82 at the axially middle portion of the hole. Hardness at FIG. 6B is Rc 37 (compared to Rc 35 produced in the coining step) which slightly increases to a hardness of Rc 37–38 in FIG. 7B. However, at the hole bottom, i.e., adjacent outboard flange surface 28, serration hardness has increased to Rc 45 because of the moving, rolling action of individual slug segments 90 as discussed.

Referring now to FIG. 5A, the same serration backing die 81 and serration punch 80 used in prior art FIG. 5B is also used in the serration step schematically disclosed in FIG. 5A to produce a softened serrated stud hole 92. The cylindrical softened serrated stud hole 92 is formed along dash line 93 schematically shown in FIG. 3A to produce a softened serrated stud hole 92 of less axial length as designated by the dimension indicated by reference numeral 94 than prior art hardened serrated stud hole 82. In the preferred embodiment, axial length dimension 94 which defines the centered press distortion zone of the invention is dimensionally centered between inboard and outboard flange face surfaces 28, 30. This is because flange 26 is symmetrical. A different flange configuration may result in an offset axial dimension 94 relative to flange face surfaces, i.e., different axial lengths of countersunk openings 72, 73. In fact, depending on flange face and mounting bolt designs, only one countersunk opening (either 72 or 73) may be required.

The action of serration punch 80 in forming the serrations or undulations 84 in the serration step of FIG. 5A is significantly different than how serration punch 80 forms the undulations in the prior art serration step of FIG. 5B. Generally, serrations or undulations 84 are formed in FIG. 5A by shear which is demonstrated by a unitary slug segment schematically depicted at 95 consistently formed with the present invention as opposed to the plurality of serration slug segments 90 formed in prior art FIG. 5B. More specifically, upset mass 79 is literally sheared or fractured on impact of serration punch 80 because truncated flange hole 50 tapers relative to cylindrical serration 93. A shear, almost fracture, action results which is demonstrated or established by the fact that the unitary slug 95 is produced. In this respect, reference should be had to photomicrograph (50× magnification) disclosed in FIG. 6A which shows the softened serrated stud hole after serration of upset mass 79. It should be noted that the serrations start slightly inward of the upset mass shown in FIG. 4A and essentially produces a clean break with a slight working of the grain at a portion of the hole surface previously work hardened as a result of the grain distortion of upset mass 79 extending down the hole surface. (Photomicrograph 6A is not at precisely the same position as photomicrograph of FIG. 4.) Rockwell hardness at the stud hole surface of FIG. 5A is Rc 32. Grain structure of softened serrated stud hole 92 at the axial mid-point of the serration is shown in FIG. 6A which corresponds to the grain structure illustrated in prior art FIG. 6B. Note the absence of grain flow lines and Rockwell hardness of FIG. 6A is Rc 31–32. At the bottom of softened serrated stud hole 92, adjacent outboard flange face surface 28, Rockwell hardness is Rc 33. Thus, throughout the axial length of serrated stud hole 92, the hardness at the beginning, middle and end of the stud hole, i.e., 31—31,32—33 is approximately equal to the hardness of a drilled hole in bearing steel, i.e., 30–32 Rc and significantly less hard than that produced in the prior art hardened serrated stud at the beginning, middle and end, i.e., Rc 37—37,38–45.

V. Stud Press Fit Step.

Wheel studs are press-fitted into softened serrated stud holes 92 in the same way that wheel studs were press-fitted into conventional hardened serrated stud holes 82 and a schematic diagram of the arrangement is not disclosed. The press arrangement is generally as disclosed in any of the three prior steps and includes an annular backing die with stud hole openings circumferentially spaced and an annular striking die for pressing studs into the stud holes. A swivel strike plate between press and stud heads may be used, the effect of which is to direct the total force of the press against any stud which "hangs" in any stud hole.

A typical wheel stud 100 is shown in a longitudinal view in FIG. 8 and includes a stud head 101, a threaded shank 102 and a serrated stem 103 between stud head 101 and threaded shank 102 about which undulations 84 circumferentially extend for an axial portion of serrated stem 102. However, the number of undulations in wheel stud 100 is different than the number of undulations formed in the serrated stud hole (either 92 or 82). Typically, there is anywhere from one to three less undulations in wheel stud 100 than in the serrated stud hole. The hardness of stud bolt 100 is a couple of points higher than the hardness of hardened serrated stud hole 82, i.e., greater than 45 Rc.

As noted in the discussion above, it is known to provide a stud flange hole 40 by simply drilling a through hole in wheel flange 26. The drilled stud hole will have a diameter "D" equal to minor diameter 87 of the serrations in wheel stud 100. When mounting stud 100 is pressed into a drilled flange hole (extending between axial face surfaces 26, 28), mounting stud 100 acts as a die, because of its hardness, and simply cuts undulations 84 into the drilled stud hole as it is pressed through wheel flange 26. The striking die and backing die in the press fitting station have to be suitably configured to support mounting studs 100 to maintain perpendicularity with flange inboard and outboard face surfaces 28, 30. The present invention can be applied to a drilled, not punched, wheel stud hole as follows:

a) A through hole of diameter D is drilled in a first step such as illustrated in prior art FIG. 2B.
  b) Inboard and outboard countersunk openings 72, 73 are then drilled, not punched, at each axial end of the drilled flange hole 40 in a counterbore operation functionally performed in FIG. 3A. The axial distance of the counterbores is within the specified ranges of the punch counterbores, i.e., 10–25% of the axial width or thickness of wheel flange 26.
  c) Wheel stud 100 is then pressed into the drilled hole which now extends between inboard and outboard countersunk openings 72, 73.

In accordance with this embodiment of the invention, grain distortion or deformation resulting from pressing serrations 84 of wheel stud 100 into the drilled hole principally occurs in press zone 94 which is purposely spaced by counterbores 72, 73 from inboard, outboard flange face surfaces 30, 28. Grain deformation has to extend radially outward in the press zone beyond the diameters of countersunk bores 72, 73 and then laterally as well as radially propagate until reaching the grain structure at inboard and outboard flange surfaces 30, 28 before distortion in outboard flange face surface 28 occurs. An impediment to flange distortion is thus purposefully caused by forming the drilled hole to occur in a centered distortion zone within flange 26. At the same time, press fit is established notwithstanding short and centered press zone 94. Alternatively, or for steels other than bearing steels, the major diameter of wheel stud serrations 84 may have to be slightly or marginally increased in the drilled hole alternative embodiment or the hole diameter adjusted.

The invention, however, has specific and uniquely beneficial aspects when applied to softened serrated stud hole 92 formed as described in FIGS. 2A, 3A and 5A. When wheel stud 100 is pressed into hardened serrated stud holes 82 formed as described in FIGS. 2B, 3B and 5B, the major diameter of the stud serrations is equal to the major diameter of the stud hole serrations but the minor diameter of wheel stud 100 undulations 84 is slightly greater than the minor diameter of undulations 84 in hardened stud hole 82 by approximately 0.005". Thus, a fine sliver of stud hole serration is cut from peaks 85 of serrated stud hole 82 by the shank of serrated stem portion 103 while the undulations 84 in serrated stud hole 82 are distorted or sheared as the serrated stem portion 103 is press-fitted into hardened serrated stud hole 82. The sliced sheared or pressed metal resulting from a press fit is forced out the bottom (outboard flange surface 28) of hardened serrated stud hole 82 and even though corner breaks 64, 65 are provided, can conceivably collect between stud serration segment 103 and outboard corner break 65 potentially causing difficulty in seating brake drum 20 or rotor. More significantly, hardened serrated stud hole 82 is hardened prior to wheel stud 100 insertion. Deformation in grain structure has already occurred and, in particular, high deformation, Rc 45, has already occurred at bottom end of hardened serrated stud hole 82 (adjacent outboard flange surface 28). Additionally work hardening t hardened serrated stud hole 82 now propagates grain deformation to outboard flange face surface 28. If the deformation becomes severe, flange distortion or warpness can occur. One indication of the deformation of the stud hole, any stud hole (whether drilled or serrated), is the press force required to seat wheel studs 100. That is, the press force is directly correlated to the grain distortion or deformation producing distortion or warpness in outboard flange surface 28.

The pierced hole embodiment of the present invention, as described in FIGS. 2A, 3A and 5A, avoids this result or tendency to cause this result as follows:

A) first, the softened serrated punch holes 92 have a hardness equal to the hardness of a drilled hole;
  B) second, the grain deformation is less because i) for the drilled hole embodiment, the material removed from the softened serrated stud hole 92 when wheel studs 100 are pressed therein is less than the material removed from the prior art drilled hole and ii) for the pierced hole embodiment, the grain structure has not been deformed in the soft serrated stud hole 92 as in hardened serrated stud hole 82 so that further grain deformation is possible before propagation to flange face surfaces 28, 30 occurs; and,
  C) third, soft serrated stud hole 92 is dimensioned by press zone 94 and spaced by countersunk 72, 73 from inboard and outboard flange surfaces 30, 28 so that grain deformation has to propagate and extend around countersunk openings 71, 72 to outboard flange surface 28 to cause distortion thereof which is a longer path than that of the prior art.

As a general indication of the improvement achieved in the present invention, it is noted that a press force of approximately 6,500 lbs. is required to press wheel studs 100 into hardened serrated stud holes 82 produced as described in FIGS. 2A, 3A and 5A. If the stud holes are through drilled as described and wheel studs 100 simply pressed into the soft drilled stud holes, the press force is reduced to approximately 5,250 lbs. If soft serrated stud holes are formed in accordance with the present invention as described with reference to FIGS. 2A, 3A and 5A, the press force is reduced to about 5,000 lbs. It must be, however, noted that the press force does not take into account the benefits of centered press zone 94 as discussed but it should be clear to those skilled in the art that a reduction in press force coupled with the benefits of a centered press zone results in a considerable improvement in a wheel spindle 14 having minimal LRO. A further advantage resulting from the soft hole/centered press zone occurs should wheel stud 100 fracture for any number of reasons during operation of the vehicle. The fractured stud can be removed with a simple drift punch so that drilling the stud out of the stud hole is not required. The serrations or undulations 84, surprisingly, are still functional and an OEM wheel stud 100 (not an oversized stud) can be inserted into the stud hole and pulled non rotationally tight vis-a-vis the conventional wheel lug nut.

The invention has been described in an illustrative manner, and it is to be understood that the terminology that has been used is intended to be in the nature of words of description rather than of limitation. Obviously, many modifications and variations of the present invention are possible in light of the above teachings and will be apparent to those skilled in the art upon reading and understanding the description of the invention set forth above. All such variations and modifications are intended to be included within the scope of the invention described herein. It is therefore to be understood that within the scope of the appended claims, the invention may be practiced otherwise than as specifically described.

Having thus defined the invention, it is claimed:

1. A method for forming an opening in a steel flange into which is pressed a serrated shaft comprising the acts of:
    a) providing a blanking die having an opening on one side of the flange and a punch having a diameter smaller than the blanking die opening at the opposite side of the flange;
    b) forcing the punch through the flange to produce an axially extending frusto-conical opening having a minor diameter equal to the punch diameter at the opposite flange side and a major diameter equal to the blanking die opening at the one flange side;
    c) providing a coining punch of diameter greater than the shaft major diameter;
    d) forcing the coining punch into each end of the frusto-conical opening a set axial distance sufficient to extrude at least in the frusto-conical opening adjacent the minor diameter a work-hardened upset metal mass while providing countersunk openings at the axial ends of the frusto-conical opening;
    e) providing a cylindrical serration punch; and,
    f) forcing the serration punch through the frusto-conical opening from the opposite side to produce a cylindrical hole between the countersunk openings while shearing the work-hardened upset metal mass from the frusto-conical opening and forming radially outward extending serrations which extend for some axial distance in flange metal that is in a substantially non-work hardened state.

2. The method of claim 1 wherein the flange is the flange of a wheel spindle formed of bearing steel with the one side of the flange being an outboard surface in contact with a brake element, the opposite side of the flange being an inboard surface and the shaft is a threaded, serrated stud having a head adjacent the inboard surface.

3. The method of claim 2 wherein the diameter of the blanking die is at least about 20% greater than the diameter of the punch but not greater than about 50% of the diameter of the punch.

4. The method of claim 3 wherein the axial thickness of the flange is between about 80 to 100% of the diameter of the punch.

5. The method of claim 2 wherein the depth of the countersunk openings are sized to axially extend into the frusto-conical openings a set distance such that when the serrated shaft is pressed into the opening the press fit force is transmitted to and absorbed by flange metal spaced from the outboard and inboard flange surface.

6. The method of claim 5 wherein the serration punch produces a substantially uniform cylinder between the coined counterbores.

7. The method of claim 6 wherein the axial depth of each countersunk opening extends from about 10 to about 25% of the thickness of the flange.

8. The method of claim 7 wherein the bearing steel is a normalized steel having alloying elements.

9. The method of claim 8 wherein the alloying elements includes one or more elements selected from the group consisting of carbon (C), manganese (Mn) sulphur (S), phosphorous (P), silicon (Si), chromium (Cr), copper (Cu), nickel (Ni), and molybdenum (Mo).

10. The method of claim 1 wherein the depth of the countersunk openings are sized to axially extend into the frusto-conical openings a set distance such that when the serrated shaft is pressed into the opening the press fit force is transmitted to and absorbed by flange metal spaced from the outboard and inboard flange surface.

* * * * *